US008238229B2

(12) United States Patent
Guan

(10) Patent No.: US 8,238,229 B2
(45) Date of Patent: Aug. 7, 2012

(54) METHOD AND DEVICE FOR LOOP WITHDRAWAL IN A MPLS NETWORK

(75) Inventor: Hongguang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 12/411,866

(22) Filed: Mar. 26, 2009

(65) Prior Publication Data

US 2009/0180401 A1    Jul. 16, 2009

Related U.S. Application Data

(63) Continuation of application No. PCT/CN2007/070748, filed on Sep. 21, 2007.

(30) Foreign Application Priority Data

Sep. 30, 2006    (CN) .......................... 2006 1 0063002

(51) Int. Cl.
*G01R 31/08* (2006.01)
*G06F 15/173* (2006.01)

(52) U.S. Cl. ..................... 370/216; 370/242; 709/238

(58) Field of Classification Search .......... 370/216–224, 370/242, 244, 250, 252, 352, 389, 392, 396, 370/397; 709/230, 234, 237, 238, 240, 241, 709/242

See application file for complete search history.

(56) References Cited

U.S. PATENT DOCUMENTS

| 6,501,754 | B1 * | 12/2002 | Ohba et al. ..................... 370/389 |
| 6,529,958 | B1 * | 3/2003 | Oba et al. ....................... 709/237 |
| 6,879,594 | B1 * | 4/2005 | Lee et al. ........................ 370/408 |
| 7,283,563 | B1 * | 10/2007 | Allan ............................... 370/469 |
| 7,609,620 | B2 * | 10/2009 | Raj et al. ......................... 370/225 |
| 7,876,672 | B2 * | 1/2011 | Chao et al. ..................... 370/218 |
| 2002/0176371 | A1 | 11/2002 | Behzadi |

(Continued)

FOREIGN PATENT DOCUMENTS

CN         1361612 A          7/2002

(Continued)

OTHER PUBLICATIONS

Yoshihiro Ohba "MPLS Loop Prevention Mechanism", RFC3063, pp. 1-4, Feb. 2001.*

(Continued)

*Primary Examiner* — Michael Thier
*Assistant Examiner* — Prince A Mensah
(74) *Attorney, Agent, or Firm* — Leydig, Voit & Mayer, Ltd.

(57) ABSTRACT

A loop withdrawal method in multi-protocol label switching is disclosed. When detecting a rewinding event of colored thread, a node judges whether an upstream interface of the colored thread is in a stalled status, and if yes, prohibits distribution of a colored thread rewinding message via the upstream interface of the colored thread; otherwise, the node continues to distribute the colored thread rewinding message and transmit label mapping via the upstream interface. When detecting a withdrawal event of the colored thread, the node removes colored thread information of the upstream interface of the colored thread, judges whether the node has received another colored thread for a same service, and if yes, extends a new colored thread via a downstream interface of the colored thread; otherwise, the node continues to distribute a colored thread withdrawal message via the downstream interface of the colored thread.

3 Claims, 5 Drawing Sheets

U.S. PATENT DOCUMENTS

2006/0165017 A1    7/2006    Blasco Claret et al.
2006/0193248 A1    8/2006    Filsfils et al.

FOREIGN PATENT DOCUMENTS

| | | |
|---|---|---|
| JP | 11-243416 A | 9/1999 |
| JP | 2000-36836 A | 2/2000 |
| JP | 2000-49854 A | 2/2000 |
| WO | WO 2005/008963 A1 | 1/2005 |

OTHER PUBLICATIONS

Yoshihiro Ohba "Issues on Loop Prevention in MPLS Networks".*
Yoshihiro Ohba, MPLS Loop Prevention Mechanism, Feb. 2001, pp. 1-44.*
Yoshihiro Ohba, Issues on Loop Prevention in MPLS Networks, Dec. 1999, IEEE, pp. 64-68.*
Yoshihiro Ohba, MPLS Loop Prevention Mechanism, Feb. 2001, pp. 1-33.*
Yoshihiro Ohba, Issues on Loop Prevention in MPLS Network, IEEE, Dec. 1999, pp. 64-68.*
Vasu Jolly, Loop Detection in MPLS for Wireless Sensor Networks, 2004, pp. 439-445.*
Yoshihiro Ohba, "MPLS Loop Prevention Mechanism", RFC3063, pp. 1-4, Feb. 2001.*
Yoshihiro Ohba, "Issues on Loop Prevention in MPLS Networks", IEEE, pp. 64-68, 1999.*
Ohba et al., Issues on Loop Prevention in MPLS Networks, *IEEE Communications Magazine*, 64-68 (Dec. 1999).
Ohba et al., "MPLS Loop Prevention Mechanism," *RFC3063*, p. 1-43 (Feb. 2001).
Xu et al., "MPLS Loop Prevention/Detection Mechanism Based on Colored Thread," Journal of Nanjing University of Posts and Telecommunications (Natural Science), 21(3): 63-66 (Sep. 2001).
Notice of Reasons for Rejection in corresponding Japanese Application No. 2009-529503 (May 23, 2011.
Written Opinion of the International Searching Authority in corresponding PCT Application No. PCT/CN2007/070748 (Jan. 3, 2008).
International Search Report in corresponding PCT Application No. PCT/CN2007/070748 (Jan. 3, 2008).

* cited by examiner

METHOD AND DEVICE FOR LOOP WITHDRAWAL IN A MPLS NETWORK

CROSS-REFERENCE TO RELATED APPLICATIONS

This application is a continuation of International Patent Application No. PCT/CN2007/070748, filed Sep. 21, 2007, which claims priority to Chinese Patent Application No. 200610063002.0, filed Sep. 30, 2006, both of which are hereby incorporated by reference in their entirety.

FIELD OF THE INVENTION

The invention relates to the field of network communication technologies, and in particular, to a loop withdrawal method and a router in multi-protocol label switching (MPLS).

BACKGROUND OF THE INVENTION

A Label Switched Path (LSP) in Multi-Protocol Label Switching (MPLS) is set up by using a hop-by-hop routing and signaling information exchange, i.e., a label request and label mapping. During the setup of an LSP, the signaling messages for the label distribution are ensured to be transported over a loop-free path to prevent the LSP from having loops.

The Request for Comments 3063 (RFC3063) published by the Network Working Group of the Internet Society in 2001 presents a method for detecting and preventing a loop in the MPLS control plane, referred to as a colored thread method. In a network topology as illustrated in FIG. 1, an ingress node R1 initiates LSP setup to an egress node R5. For the service, i.e., a forwarding equivalence class corresponding to the LSP, R1 creates a globally unique sequence of digits identifying a path to the egress node R5. The sequence of digits is referred to as a colored thread, and the color of the thread is characterized by the value of the corresponding sequence of digits. R1 carries the sequence of digits, i.e., extends the colored thread, together with a hop count in a label request to be transmitted to a downstream node R2. This process is repeated on each of the nodes over R2→R3→R4 until arriving at R5. If the downstream node of the node R4 is changed from R5 to R8 due to some reason, for example, a configuration error or oscillation of the network topology, etc., the colored thread originated from R1 and the label request initiated from R1 finally go back to R1 via nodes R7 and R6. In this way, R1 may detect that the color of a colored thread for the service received via another interface is the same as the color of the colored thread extended downstream. This indicates the presence of a routing loop in the control plane. In this case, R1 becomes a loop-back crossing point.

When detecting the presence of the loop, R1 identifies the interface of loop-back of the colored thread to be in a stalled status. In this case, neither any colored thread nor any label request signaling for the same service, which is received at the interface in the stalled status from an upstream node, is extended downstream. In addition, R1 may create a new colored thread for the service, i.e., another colored thread with a different color, set a hop count with the maximum value (i.e., 255), and transmit downstream. The colored thread is copied onto each one of the nodes over the loop R1→R2→R3→R4→R8→R7→R6→R1, so as to identify the loop in the control plane. In this case, the hop count 255 indicates that the path, on which the colored thread is located, is a loop. The colored thread with the new color indicates the path of the loop. In this way, the setup of the LSP is stalled at the interface in the stalled status, thereby preventing the setup of an LSP having loop in the data plane.

As illustrated in FIG. 2, the flow of a rewinding process of a colored thread in existing systems includes the following steps. In Step 201: A node detects an event that a colored thread is rewound. In Step 202: The node rewinds the colored thread to all upstream neighbor nodes and distributes label mapping to all upstream neighbor nodes. In Step 203: The colors of colored threads at all local interfaces are set to transparent. In Step 204: The rewinding process of the colored thread is finished.

If the next-hop node of the node R4 is changed from the node R8 to R5, R4 transmits to R8 an instruction to withdraw the colored thread, and then R4 extends the colored thread to R5. Since R5 is the egress node of the LSP, R5 may rewind the received colored thread to its upstream node R4. The process is repeated on each of nodes over R4→R3→R2 until arriving at R1. R4 transmits to R8 an instruction to withdraw the colored thread, so that the colored thread of R4→R8 is withdrawn. The process is repeated on each of nodes over R8→R7-R6 until arriving at R1. The instruction information of rewinding colored thread is contained in a label allocation message and is transmitted upstream. The instruction information of withdrawing colored thread is carried in an MPLS LSP withdrawal message and is transmitted downstream.

As illustrated in FIG. 3, the flow of a withdrawal process of a colored thread on a node in the existing systems includes the following steps. In Step 301: A node detects an event that a colored thread is withdrawn. In Step 302: The node removes the colored thread information of the interface of the withdrawn colored thread. In Step 303: It is judged whether there is any colored thread for the same forwarding equivalence class from another upstream node, and if there is, step 305 is executed; otherwise, step 304 is executed. In Step 304: The node distributes an thread withdrawal event to the downstream neighbor node(s) and then the process proceeds to step 307. In Step 305: It is judged whether the hop counts for all upstream interfaces are less than those for downstream interfaces and less than 255, and if so, step 306 is executed; otherwise, step 307 is executed. In Step 306: The colored thread is extended to the downstream neighbor node. In Step 307: The withdrawal process of the colored thread is finished.

If the colored thread rewinding message arrives at R1 earlier than the colored thread withdrawal message, R1 continues to rewind the colored thread to R6. The process is also repeated on each of the nodes over R6→R7→R8 until arriving at a node which has finished the withdrawal process. Without loss of generality, R7 is assumed as the node which has finished the withdrawal process. In this way, at least a redundant LSP segment in the data plane, i.e., R7→R6→R1, is generated. This redundant and undesirable LSP segment has to be removed, from whichever of the perspective of utilization of network resources and that of controlled transmission of data services.

Normally, when a colored thread rewinding message arrives at the node R7, since there is no upstream node on the label request path of R7, R7 triggers a label release message and transmits the label release message to R6, and withdraws the colored thread. The process is repeated on R6 until arriving at R1. Since R1 is the starting point of the LSP, the transmission of the label release message is terminated on R1. In this way, the redundant LSP segment is removed.

The inventor discovered during research and application that the existing systems have at least the following disadvantages.

Firstly, if a node capable of processing an Equal Cost Multiple Path (ECMP) is on a loop-back path, there is a risk of generating a loop-back LSP. As illustrated in FIG. 4, it is assumed that each of the first ingress node R1 and the second ingress node R6 initiates LSP setup to egress node R5, that is, initiates the setup of a Multi-Point-to-Point (MP2P) LSP, and node R3 supports ECMP. In the direction toward R5, the downstream node of the node R3 is R4, the downstream node of R7 is R8, the downstream node of R8 is R3, and the downstream node of R4 is R5. If the node R7 becomes a downstream node of the ECMP supporting node R3 in the direction toward R5 and the downstream node of the node R4 is changed from R5 to R9 due to some reason, for example, a configuration error or oscillation of the network topology, etc., a colored thread extended from R1 is merged at R8 with a colored thread extended from R6. The colored thread extended from R6 arrives at R8 earlier, undergoes an ECMP processing on the node R3 and goes back to R7, and the colored thread extended from R1 arrives at R8 subsequently and is changed in color at R8 as specified in the RFC3063, that is, a colored thread is extended from R8, arrives at R4 via R3 and is looped back to R8.

In addition, if the downstream node of R4 is changed from R9 back to R5, R4 distributes a colored thread withdrawal message to R9 and continues to extend the colored thread to R5. R5 distributes a colored thread rewinding message to R4. If the colored thread rewinding message arrives at the node R8 earlier than the colored thread withdrawal message, the redundant LSP segment R8→R9 is removed, but the redundant LSP segment R7→R3 cannot be removed. In this way, a loop-back LSP of R3→R8→R7→R3 is set up, resulting in two desirable LSPs, i.e., R1→R2→R3→R4→R5 and R6→R7→R8→R3→R4→R5, and one undesirable LSP loop, i.e., R1→R2→R3→R7→R8→R3.

SUMMARY OF THE INVENTION

In one aspect, embodiments of the invention provide a loop withdrawal method in multi-protocol label switching (MPLS) to avoid a conflict during the withdrawal of a loop in multi-protocol label switching.

In another aspect, embodiments of the invention provide a multi-protocol label switching router in multi-protocol label switching to avoid a conflict during the withdrawal of a loop in multi-protocol label switching.

An embodiment of the invention provides a loop withdrawal method in multi-protocol label switching. The method includes: (1) when a node detects a rewinding event of a colored thread, judging, by the node, whether an upstream interface of the colored thread is in a stalled status, and prohibiting distribution of a colored thread rewinding message via the upstream interface if the upstream interface of the colored thread is in the stalled status, or continuing to distribute the colored thread rewinding message and transmit label mapping via the upstream interface if the upstream interface of the colored thread is not in the stalled status; and (2) when the node detects a withdrawal event of the colored thread, removing, by the node, colored thread information of the upstream interface of the colored thread, judging whether the node has received another colored thread for same service, and extending a new colored thread via a downstream interface of the colored thread if the node has received another colored thread for the same service, or continuing to distribute a colored thread withdrawal message via the downstream interface of the colored thread if the node has not received another colored thread for the same service.

An embodiment of the invention provides a multi-protocol label switching router. The router includes: (1) a message reception unit, adapted to receive a message including a colored thread rewinding message and/or a colored thread withdrawal message from other node; (2) a message transmission unit, adapted to transmit a message including a colored thread rewinding message and/or a colored thread withdrawal message to other node; and (3) a judging unit, adapted to judge, after the message reception unit receives a colored thread rewinding message of rewinding a colored thread from a downstream neighbor node, whether an upstream interface of the colored thread is in a stalled status and notify the message transmission unit to continue to distribute the colored thread rewinding message and transmit label mapping via the upstream interface of the colored thread if the upstream interface of the colored thread is not in the stalled status; and judge, after the message reception unit receives a colored thread withdrawal message of withdrawing the colored thread from an upstream neighbor node, whether current node has received another colored thread for same service and notify the message transmission unit to extend a new colored thread via a downstream interface of the colored thread if the current node has received another colored thread for the same service, or notify the message transmission unit to continue to distribute a colored thread withdrawal event via the downstream interface of the colored thread if the current node has not received another colored thread for same service.

As can be seen from the above solutions, in the embodiments of the invention, the rewinding of colored thread and the label mapping is stalled on an upstream interface in a stalled status, so as to prevent the setup of a redundant LSP. In addition, if there is another colored thread that is for the same forwarding equivalence class as that for the rewound colored thread, the node is allowed to extend the colored thread downstream so that the other upstream node of the node may normally obtain the rewound colored thread and the label mapping message.

DETAILED DESCRIPTION OF THE EMBODIMENTS

In the embodiments of the invention, when a node detects an event that a colored thread is rewound, if an upstream interface corresponding to the colored thread is in a stalled status, the node prohibits the distribution of a colored thread rewinding message to an upstream neighbor node via the upstream interface corresponding to the colored thread. If the upstream interface corresponding to the colored thread is in a non-stalled status, the node distributes the colored thread rewinding message to the upstream neighbor node via the upstream interface corresponding to the colored thread. When the node detects an event that a colored thread is withdrawn, the node first removes corresponding colored thread information of an interface via which a colored thread withdrawal message is received, and judges whether the node has received another colored thread for the same forwarding equivalence class from another upstream neighbor node. If there is no other colored thread for the same forwarding equivalence class from another upstream neighbor node, the node continues to distribute the colored thread withdrawal message to a downstream neighbor node corresponding to the forwarding equivalence class of the colored thread; otherwise, the node extends the another colored thread to the downstream neighbor node corresponding to the forwarding equivalence class of the colored thread.

Figure 5:
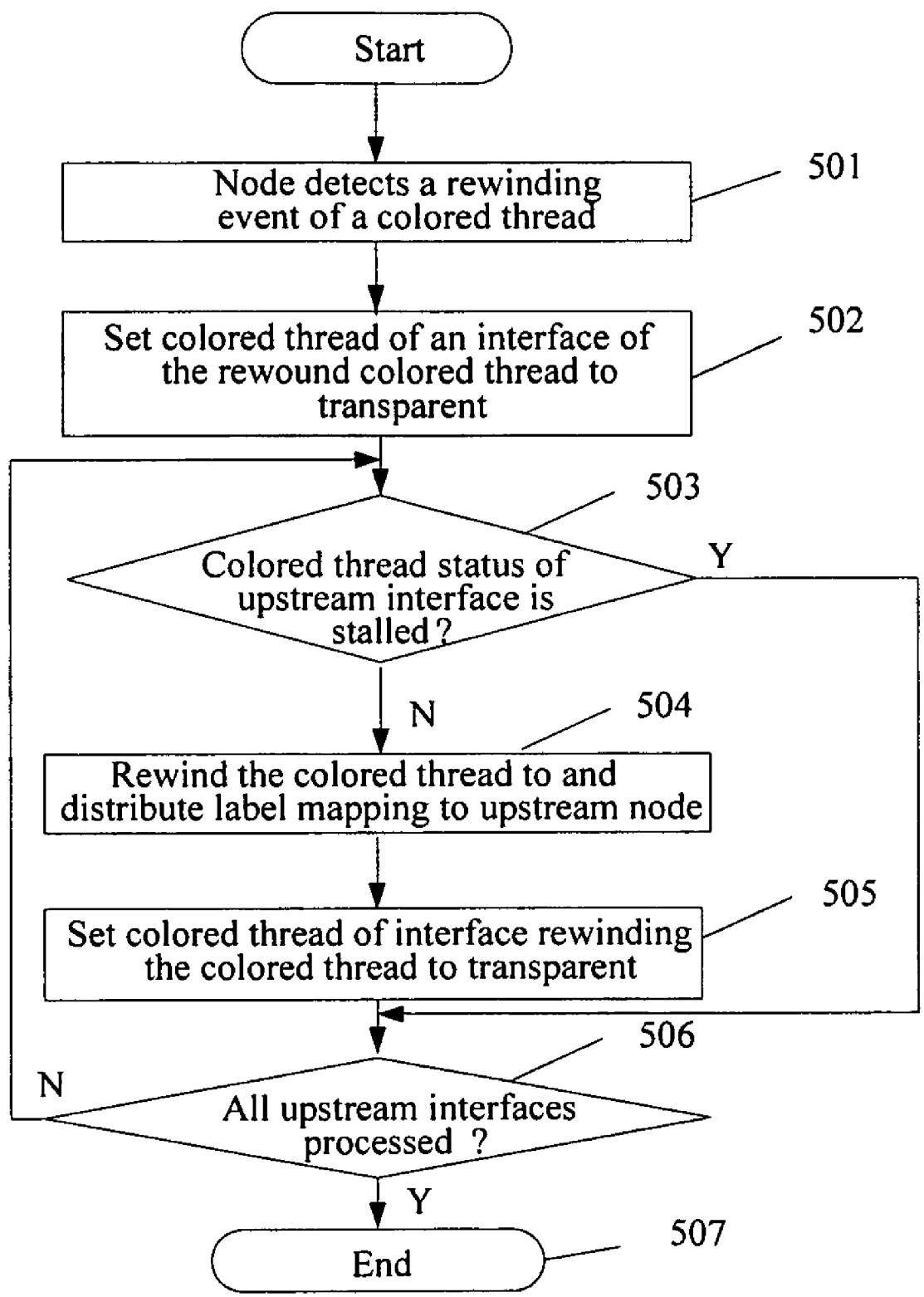
FIG. 5 is a flow chart illustrating a rewinding process of a colored thread according to an embodiment of the present invention.

FIG. 5 is a flow chart illustrating a rewinding process of a colored thread according to an embodiment of the invention. Referring to FIG. 5, the process of rewinding a colored thread by a Label Switching Router (LSR) in a topology network includes the following steps.

Step 501: The node detects an event that a colored thread is rewound.

Step 502: The node sets the color of an interface via which the rewound colored thread is received to transparent.

Step 503: It is judged whether a colored thread status of an upstream interface is in a stalled status. If so, step 506 is executed; otherwise, step 504 is executed.

Step 504: The colored thread is rewound to the upstream node and label mapping is transmitted to the upstream node.

Step 505: The color of the upstream interface via which the colored thread is rewound is set to transparent.

Step 506: It is judged whether all upstream interfaces on the node have been processed. If so, step 507 is executed; otherwise, the process returns to step 503.

Step 507: The Process is finished.

Figure 6:
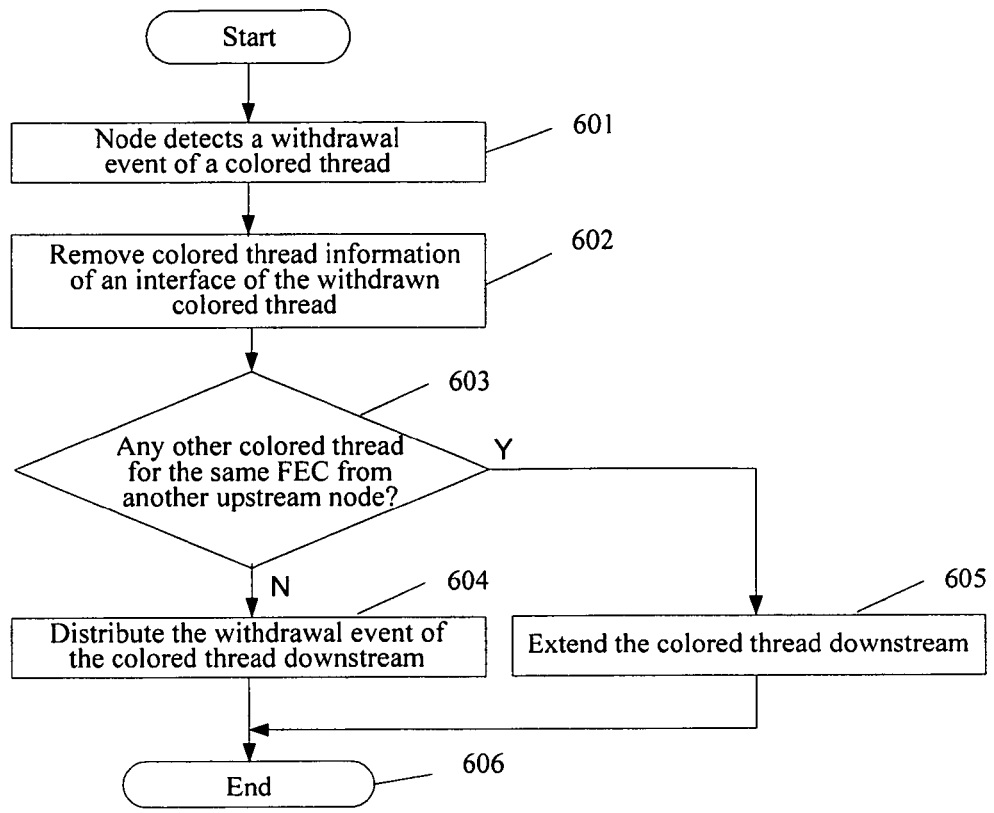
FIG. 6 is a flow chart illustrating a withdrawal process of a colored thread according to an embodiment of the present invention.

FIG. 6 is a flow chart illustrating a withdrawal process of a colored thread according to an embodiment of the invention. Referring to FIG. 6, the process of withdrawing a colored thread by a label switching router LSR in a topology network includes the following steps.

Step 601: The node detects an event that a colored thread is withdrawn.

Step 602: The colored thread information is removed from an interface of the withdrawn colored thread.

Step 603: It is judged whether the node has another colored thread for the same service. If so, step 604 is executed; otherwise, step 605 is executed.

Step 604: A new colored thread is extended to a downstream interface of the withdrawn colored thread, and the process proceeds to step 606.

Step 605: A colored thread withdrawal event is distributed to the downstream interface of the withdrawn colored thread.

Step 606: The process is finished.

Those ordinarily skilled in the art will appreciate that all or part of the steps in the methods according to the above embodiments of the invention can be accomplished by program instruction relevant hardware. The program may be stored in a computer readable storage medium, e.g., ROM/RAM, magnetic disk, or optical disk, etc.

The method according to embodiments of the invention is further described below with reference to the other drawings for further understanding of the embodiments of the invention.

Figure 1:
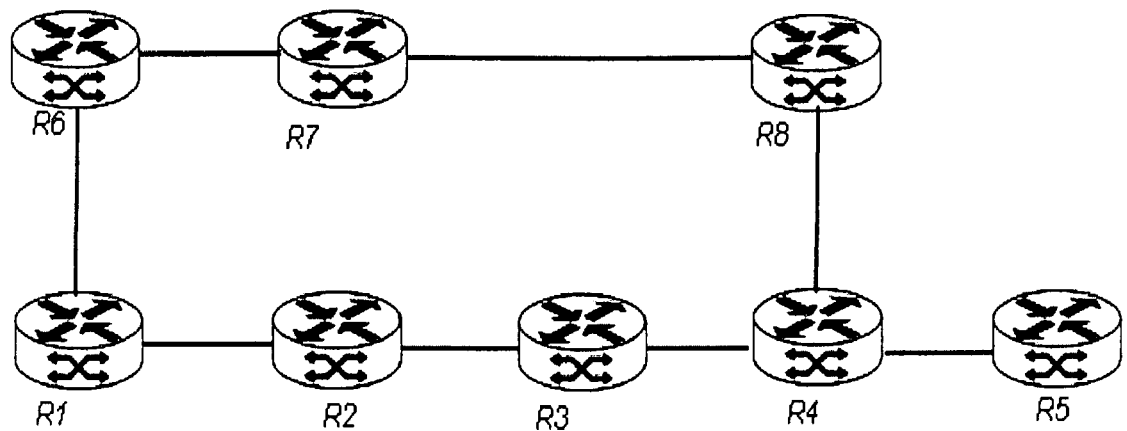
FIG. 1 is a network topology diagram illustrating an example of detecting and preventing a loop in the MPLS control plane by using a colored thread method in existing systems.
Figure 2:
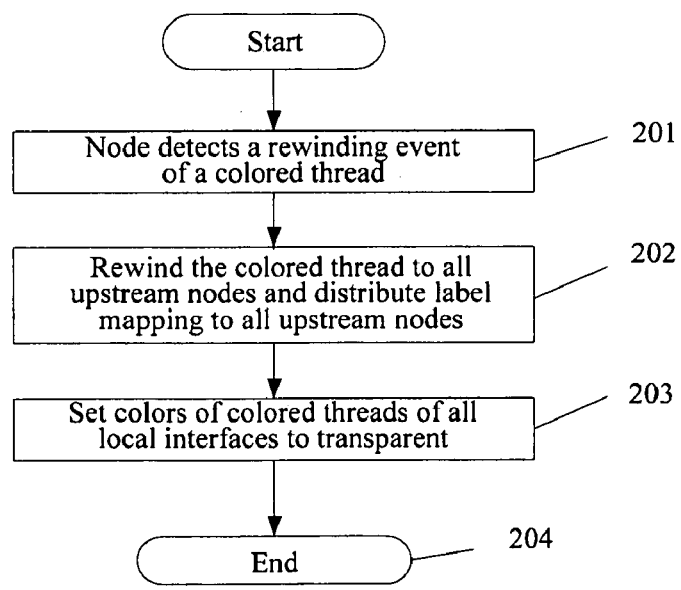
FIG. 2 is a flow chart illustrating a rewinding process of a colored thread on a node in existing systems.
Figure 3:
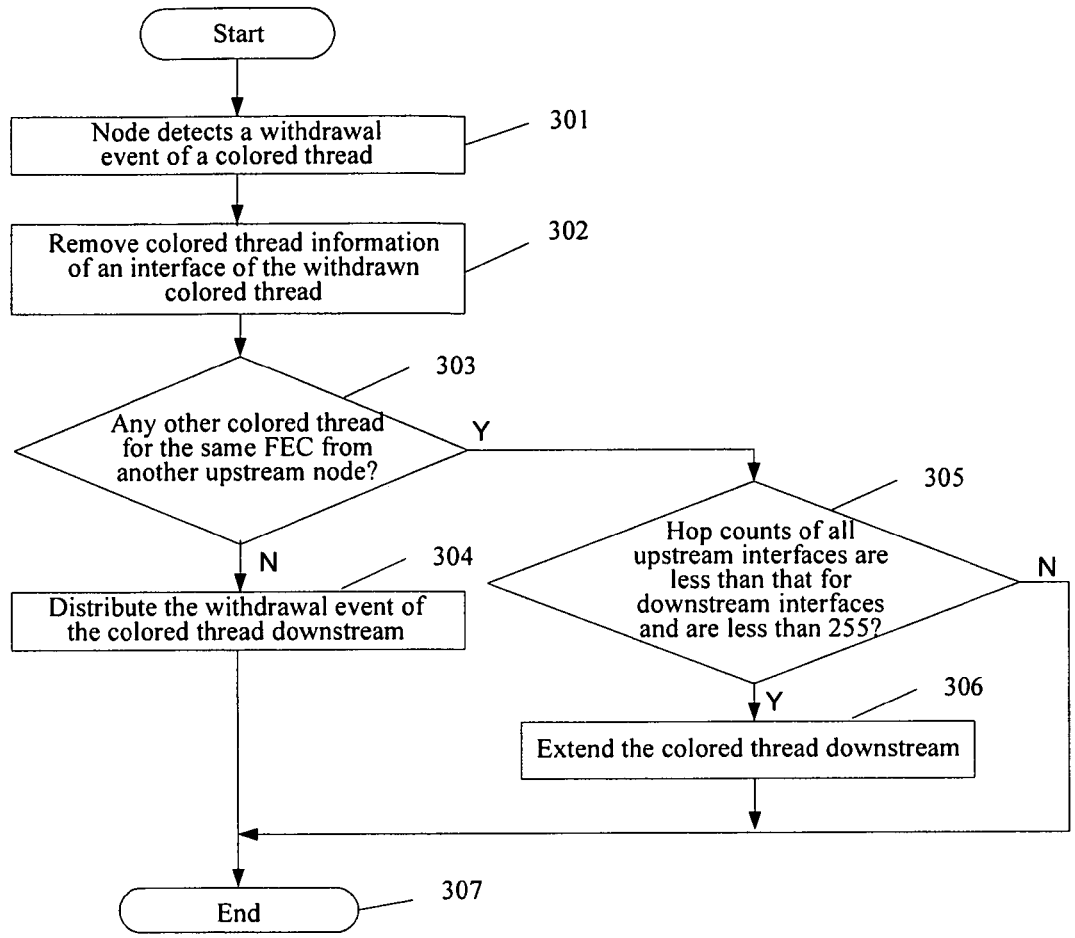
FIG. 3 is a flow chart illustrating a withdrawal process of a colored thread on a node in existing systems.

Referring to the network topology diagram according to the first embodiment of the invention as shown FIG. 1, the nodes in FIG. 1 are label switching routers, and none of the nodes in the topology network supports ECMP. The ingress node R1 attempts to set up an LSP of R1→R2→R3→R4→R5 to the egress node R5, but the intermediate node R4 considers, due to an error occurring on R4, that the LSP is required to pass through R8 in order to arrive at R5. The colored thread originating from R1 goes through the path of R1→R2→R3→R4→R8→R7→R6→R1 and back to the initiating point R1 which sets up the path. R1 detects the presence of a loop in the MPLS control plane. In this case, the interface on R1, which is in link connection with R6, is identified to be in a stalled status.

Once the intermediate node R4 uses the new next-hop node R5, R4 transmits a colored thread withdrawal message to the old next-hop node R8, and extends the colored thread to the new next-hop node R5. R5 detects that R5 itself is the egress node of the LSP upon reception of the colored thread extended from R4. This means that an LSP setup request message from the ingress node R1 successfully arrives at the egress node R5 through the loop-free path. R5 initiates a process of colored thread rewinding and label mapping, returns a response message upstream to rewind the colored thread, and allocates an MPLS label to the upstream node R4. According to the method for rewinding processing of a colored thread according to an embodiment of the invention, R4 performs the rewinding process of the colored thread in the following steps.

The node R4 receives from its downstream neighbor node R5 a label allocation message, e.g., a label mapping message of the Label Distribution Protocol (LDP) or a Resv message of the Resource ReSerVation Protocol-Traffic Engineering (RSVP-TE) protocol. In other words, the node R4 detects an event that a colored thread is rewound.

The node R4 sets the color of the colored thread corresponding to an interface, via which a colored thread rewinding message is received, to transparent.

The node R4 judges that an upstream interface, i.e., an interface of colored thread corresponding to the same forwarding equivalence class, which is in link connection with R3, is in a non-stalled status, and continues to distribute the colored thread rewinding message to the upstream node R3.

The color of colored thread of an interface in connection with R3 is set to transparent.

Since there is only an upstream interface on R4, the process is finished.

The process is repeated on the upstream nodes R3, R2, and R1, and thus the loop-free LSP of R1→R2→R3→R4→R5 is set up successfully.

Accordingly, in the method for withdrawal process of a colored thread according to the invention, a Label Switching Router (LSR) in a topology network, for example R8 without loss of generality, processes a thread withdrawal event in the following steps.

R8 receives a colored thread withdrawal message from its upstream neighbor node R4. In other words, R8 detects a colored thread withdrawal event.

R8 withdraws the colored thread extended from its upstream neighbor node, i.e., R8, removes information of the upstream neighbor node R4 for the LSP, and continues to distribute a colored thread withdrawal instruction downstream. The process is repeated on the downstream nodes R7, R6, and R1. Since R1 is the ingress node of the LSP, R1 does not distribute the colored thread withdrawal instruction to its downstream node R2.

The following two scenarios are involved in a loop recovery method according to an embodiment of the invention.

If R1 has received a colored thread withdrawal message from R6 before receiving a colored thread rewinding message from its downstream node R2, the colored thread rewinding message from R2 is terminated at R1 because R1 has removed the information of the downstream neighbor node for the LSP upon reception of the colored thread withdrawal message.

If R1 has received a colored thread rewinding message from R2 before receiving a colored thread withdrawal message from its downstream node R6, the colored thread rewinding message from R2 is also terminated at R1 because the interface of the link between R1 and the upstream neighbor node R6 has been identified to be in a stalled status for colored thread of the same forwarding equivalence class.

As can be seen in the method according to the invention, no redundant LSP or LSP segment is set up in both of the two cases, because no colored thread rewinding message may pass through the interface identified to be in a stalled status.

Figure 4:
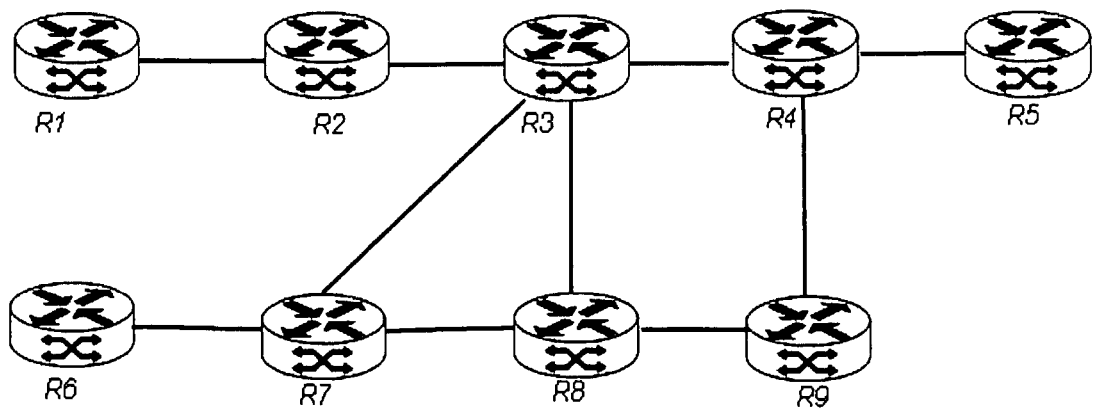
FIG. 4 is a network topology diagram illustrating an example of setting up a loop-back LSP by using the colored thread method due to the existing ECMP.

Referring to the network topology diagram in the second embodiment of the invention as shown in FIG. 4, the nodes in FIG. 4 are label switching routers. The difference of the topology as shown in FIG. 4 from that in FIG. 1 lies in that the topology of FIG. 4 includes a node R3 that supports ECMP. R1 attempts to set up an LSP of R1→R2→R3→R4→R5, and R6 attempts to set up an LSP of R6→R7→R8→R3→R4→R5. R3 supports ECMP, and particularly, R3 uses R4 and R7 as the next-hop nodes on routes to R5. However, using R7 as a next-hop node on the route to R5 is a mistake. In addition R4 uses R9 as a next-hop node of a route to R5 due to an error of R4 or network oscillation. Therefore, the colored thread originating from R6 for the LSP goes back to R7 through the path of R6→R7→R8→R3, and the colored thread originating from R1 for the LSP goes back to R3 through the path of R1→R2→R3→R4→R9→R8→R3. Accordingly, the presence of two loops is detected. In this case, the colored thread interface on R7, which is in link connection with R3, is identified to be in a stalled status, and the colored thread interface on R3, which is in link connection with R8 is identified, to be in a stalled status. The LSPs originating from R1 and R6 are intended for the same forwarding equivalence class. In other words, both the LSPs are destined for R5. This means the two LSPs use the same colored thread on the same node to identify the signaling path and detect the loop.

Once R4 uses R5 as a new next-hop node on the route to the node R5, R4 distributes a colored thread withdrawal message to the old next-hop node, i.e., R9, and extends the colored thread to the new next-hop node R5. Upon reception of the colored thread extended from R4, R5 detects that R5 itself is the egress node of the LSP. This means that an LSP setup request message from the ingress node R1 successfully arrives at the egress node R5 through a loop-free path. R5 initiates a process of colored thread rewinding and label mapping, returns a response message upstream to rewind the colored thread, and allocates an MPLS label to the upstream node R4. In the method for rewinding a colored thread according to the invention, since none of R1, R2, and R4-R9 supports ECMP, these nodes process the rewound colored thread as the corresponding nodes in the first embodiment of the invention. Since R3 supports ECMP, R3 processes the rewound colored thread as follows.

The node R3 receives a rewind processing message from R4 and sets the color of the colored thread interface in connection with R4 to transparent.

R3 rewinds the colored thread upstream. Since R3 has two upstream interfaces including the colored thread interface in connection with R1 and the colored thread interface in connection with R8, the two interfaces are required to be processed respectively. It is judged that the colored thread interface in connection with R2 is in a non-stalled status, and the colored thread is rewound to the upstream node R2 and the color of the colored thread interface in connection with R2 is set to transparent. It is judged that the colored thread interface in connection with R8 is in a stalled status, and then the colored thread is stalled at the colored thread interface in connection with R8.

After a period of time, a loop-free LSP of R1→R2→R3→R4→R5 is set up successfully. Since the colored thread rewinding and label allocation instruction cannot be spread onto the upstream node R8, the LSP loop of R3→R8→R7-R3 can be prevented. In this way, the problem of setting up an LSP loop due to the ECMP may be solved. However, it shall be noted that, the main reason of causing the loop-back path of R3→R8→R7-R3 is that R3 uses R7 as a next-hop node to R5, and, since this reason does not disappear, the loop-back path of R3→R8→R7-R3 is still present.

Accordingly, in the method for withdrawal processing of a colored thread according to an embodiment of the invention, the processing of a thread withdrawal event on a node in the topology network is as follows.

R9 receives a colored thread withdrawal message from its upstream neighbor node R4, withdraws the colored thread extended from the upstream neighbor node R4, and then removes the information of an upstream neighbor node for the LSP and continues to distribute a colored thread withdrawal instruction to its downstream neighbor node R8.

The process is repeated on the downstream neighbor node R8. R8 judges that R8 has received a colored thread for the same forwarding equivalence class from the downstream node R3, and therefore does not distribute any colored thread withdrawal instruction to its downstream node R3, but extends the colored thread to the downstream node R7.

Figure 7:
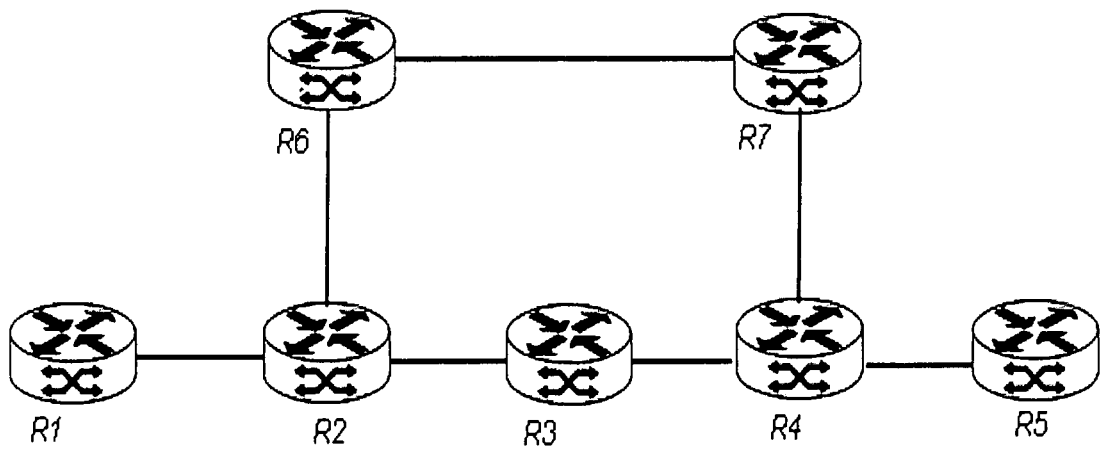
FIG. 7 is a network topology diagram illustrating an illustrative application of the colored thread method in an embodiment of the present invention.

Referring to the network topology diagram in a third embodiment of the invention as shown in FIG. 7, R1 attempts to set up an LSP of R1→R2→R3→R4→R5, but R4 uses R7 as the next-hop node on a route to R5 due to an error of R4. A colored thread for the LSP originating from R1 goes back to R2 through a path of R1→R2→R3→R4→R7→R6→R2. In this way, the presence of a loop in the MPLS control plane is detected. In this case, the colored thread interface on R2, which is in link connection with R6, is identified to be in a stalled status.

Once R4 uses R5 as a new next-hop node on the route to the node R5, R4 distributes a colored thread withdrawal instruction to the old next-hop node, i.e., R7, and extends the colored thread to the new next-hop node R5.

R5 detects that R5 itself is the egress node of the LSP upon reception of the colored thread extended from R4. This means that an LSP setup request message from the ingress node R1 successfully arrives at the egress node R5 through a loop-free path. R5 rewinds the colored thread upstream and allocates an MPLS label to the upstream node. The process is repeated on the upstream nodes R4, R3, R2, and R1, and thus the loop-free LSP of R1→R2→R3→R4→R5 is set up successfully.

R7 receives the colored thread withdrawal message transmitted from R4, removes the colored thread extended from its upstream neighbor node R4, and then removes the information of the upstream neighbor node for the LSP and continues to distribute the colored thread withdrawal message downstream. In this case, if the link between R6 and R7 has a failure, R6 becomes a leaf node and cannot receive any colored thread withdrawal message from R7.

Since R6 cannot receive any colored thread withdrawal message from R7, R2 cannot receive any colored thread withdrawal message from R6, either. Nevertheless, a colored thread rewinding message from R3 cannot be distributed from R2 to its upstream neighbor node R6, because the interface, on R2, corresponding to the link between R2 and R6 has been identified to be in a stalled status. Therefore, no redundant LSP or LSP segment is set up, and no colored thread rewinding message is forwarded to its upstream neighbor via the interface that is identified to be in a stalled status.

Figure 8:
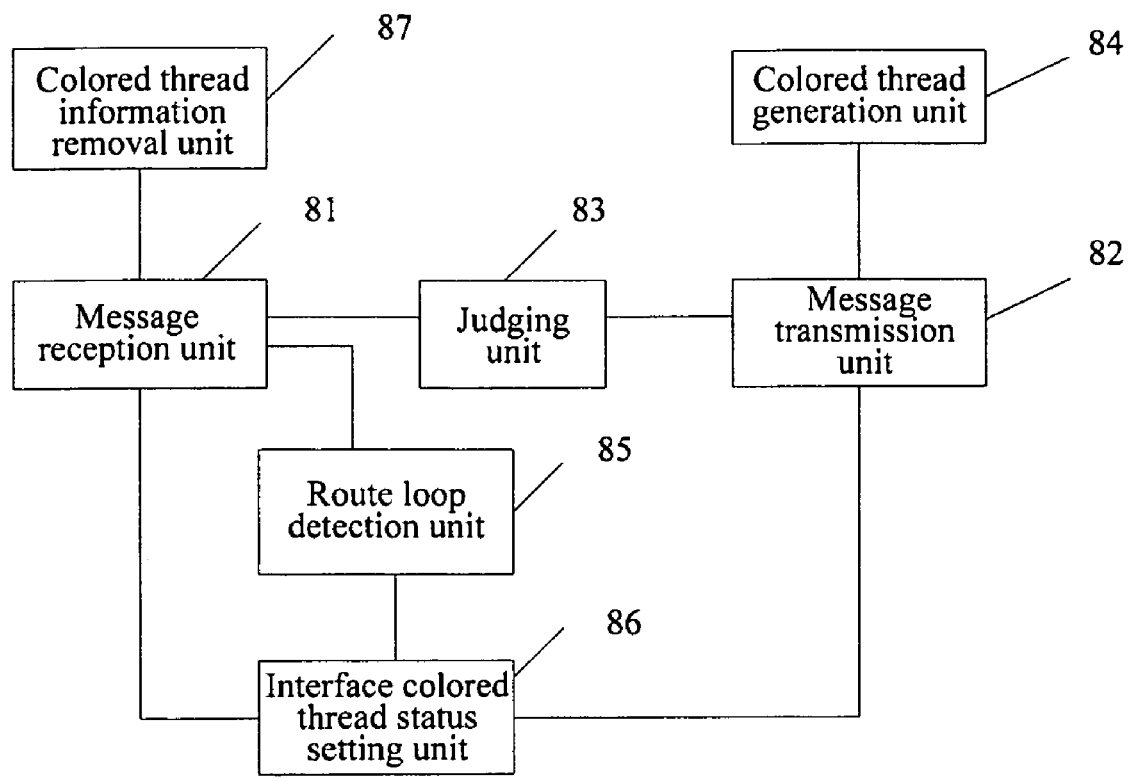
FIG. 8 is a block diagram illustrating the principle of a label switching router according to an embodiment of the present invention.

FIG. 8 is a block diagram illustrating the principle of a label switching router according to an embodiment of the invention.

As shown in FIG. 8, the router may include a message reception unit 81, a message transmission unit 82 and a judging unit 83.

The message reception unit 81 is adapted to receive a message including a colored thread rewinding message and/or a colored thread withdrawal message from other node. The message transmission unit 82 is adapted to transmit a message including a colored thread rewinding message and/or a colored thread withdrawal message to other node. The judging unit 83 is adapted to judge, after the message reception unit 81 receives a colored thread rewinding message of rewinding a colored thread from a downstream neighbor node, whether an upstream interface of the colored thread is in a stalled status and notify the message transmission unit 82 to continue to distribute the colored thread rewinding message and transmit label mapping via the upstream interface of the colored thread if the upstream interface of the colored thread is not in the stalled status; and judge, after the message reception unit 81 receives a colored thread withdrawal message of withdrawing the colored thread from an upstream neighbor node, whether current node has received another colored thread for same service and notify the message transmission unit 82 to extend a new colored thread via a downstream interface of the colored thread if the current node has received another colored thread for the same service, or notify the message transmission unit 82 to continue to distribute a colored thread withdrawal event via the downstream interface of the colored thread if the current node has not received another colored thread for same service.

In addition, the router may further include a colored thread generation unit 84 adapted to generate the new colored thread which the message transmission unit 82 extends via the downstream interface of the colored thread.

A route loop detection unit 85 may be included in the router, and is adapted to detect whether there is a route loop in accordance with the colored thread rewinding message received by the message reception unit 81. If a route loop is detected, an interface colored thread status setting unit 86 sets the interface via which the colored thread is rewound to be in a stalled status. The interface colored thread status setting unit 86 also sets the colored thread of the interface via which the colored thread is rewound to transparent after the message reception unit 81 receives the colored thread rewinding message from the downstream neighbor node, and sets the colored thread of the interface via which the colored thread is rewound to transparent after the message transmission unit 82 continues to distribute the colored thread rewinding message and transmits the label mapping via the upstream interface.

A colored thread information withdrawal unit 87 may be included in the router and is adapted to remove colored thread information of the interface via which the colored thread is withdrawn after the message reception unit 81 receives the colored thread withdrawal message from its upstream neighbor node.

The particular process that the multi-protocol label switching router rewinds and withdraws a colored thread according to the method in the embodiments of the invention may be found in the above descriptions, and is not repeated herein.

The above descriptions are merely illustrative of the preferred embodiments of the invention, and the scope of the invention should not be limited thereto. Any variations or substitutions which can readily occur to those skilled in the art without departing from the invention are encompassed within the scope of the invention which shall be as defined by the appended claims.

What is claimed is:

1. A multi-protocol label switching router, comprising:
   a message reception unit, configured to receive a message including a colored thread rewinding message and a colored thread withdrawal message from a node;
   a message transmission unit, configured to transmit the message including the colored thread rewinding message and the colored thread withdrawal message to another node;
   and a judging unit, configured to judge, after the message reception unit receives the colored thread rewinding message before receiving the colored thread withdrawal message from a downstream neighbor node, whether an upstream interface of the colored thread is in a stalled status and notify the message transmission unit to continue to distribute the colored thread rewinding message and transmit a label mapping via the upstream interface of the colored thread if the upstream interface of the colored thread is not in a stalled status;
   and notify the message transmission unit to prohibit distribution of the colored thread rewinding message via the upstream interface of the colored thread if the upstream interface of the colored thread is in the stalled status.

2. The multi-protocol label switching router according to claim 1, further comprising:
   a route loop detection unit, configured to detect whether a route loop is present according to the colored thread rewinding message received by the message reception unit; and
   an interface colored thread status setting unit, configured to set an interface via which the colored thread is rewound to a stalled status when the route loop detection unit detects that a route loop is present; set the colored thread of the interface via which the colored thread is rewound to transparent after the message reception unit receives the colored thread rewinding message from the downstream neighbor node; and set the colored thread of the interface via which the colored thread is rewound transparent after the message transmission unit continues to distribute the colored thread rewinding message and transmit the label mapping via the upstream interface.

3. The multi-protocol label switching router according to claim 1, further comprising:
   a route loop detection unit, configured to detect whether a route loop is present according to the colored thread rewinding message received by the message reception unit; and
   an interface colored thread status setting unit, configured to set an interface via which the colored thread is rewound to a stalled status when the route loop detection unit detects that the route loop is present, set the colored thread of the interface via which the colored thread is rewound transparent after the message reception unit receives the colored thread rewinding message from the downstream neighbor node, and set the colored thread of the interface via which the colored thread is rewound transparent after the message transmission unit continues to distribute the colored thread rewinding message and transmit the label mapping via the upstream interface.

* * * * *